(12) United States Patent
Benoit et al.

(10) Patent No.: US 7,189,043 B2
(45) Date of Patent: Mar. 13, 2007

(54) TETHERED RETAINER ASSEMBLY

(75) Inventors: Thomas A. Benoit, Bourbannais, IL (US); Brian R. Peek, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/067,195

(22) Filed: Feb. 25, 2005

(65) Prior Publication Data
US 2006/0193710 A1   Aug. 31, 2006

(51) Int. Cl.
*F16B 37/00* (2006.01)
(52) U.S. Cl. .................. 411/104; 292/340; 24/669
(58) Field of Classification Search ............... 411/104, 411/433, 437; 24/702, 669; 292/340, 346, 292/DIG. 38, DIG. 51
See application file for complete search history.

(56) References Cited

U.S. PATENT DOCUMENTS

| | | | | |
|---|---|---|---|---|
| 2,986,791 A * | 6/1961 | Strehlein | ...................... | 24/669 |
| 4,138,151 A * | 2/1979 | Nakao | ...................... | 292/76 |
| 4,424,612 A * | 1/1984 | Muller et al. | ................ | 24/669 |
| 4,436,201 A * | 3/1984 | Inaba | ........................ | 206/309 |
| 4,544,191 A * | 10/1985 | Nakama | ................. | 292/341.15 |
| 4,550,230 A * | 10/1985 | Johnson | ..................... | 181/199 |
| 4,934,889 A * | 6/1990 | Kurosaki | .................... | 411/433 |
| 5,201,858 A * | 4/1993 | Otrusina | .................. | 24/573.11 |
| 5,598,994 A * | 2/1997 | Olewinski et al. | ............ | 248/73 |
| D380,667 S * | 7/1997 | Kanamori et al. | ........... | D8/382 |
| 5,795,117 A * | 8/1998 | Onoda | ......................... | 411/92 |
| 5,816,762 A * | 10/1998 | Miura et al. | ................ | 411/433 |
| 5,851,097 A | 12/1998 | Shereyk et al. | ............. | 411/508 |
| 6,719,337 B1 * | 4/2004 | Ji | ........................... | 292/341.17 |
| 6,796,760 B1 * | 9/2004 | Tanner | ....................... | 411/107 |

FOREIGN PATENT DOCUMENTS

| | | |
|---|---|---|
| DE | 19737 159 | 3/1999 |
| DE | 102 59 976 | 7/2004 |
| EP | 1363030 | 11/2003 |

* cited by examiner

*Primary Examiner*—Flemming Saether
(74) *Attorney, Agent, or Firm*—Mark W. Croll; Paul F. Donovan

(57) ABSTRACT

A retainer for holding nuts, bolts and other components includes a pocket configured for retaining a portion of the component and having an entrance opening for insertion of the component into the pocket. A deflectable blocking element is disposed in the opening and yields to insertion pressure, allowing the component to enter the pocket. A tether secured near the distal end of the blocking element resists deflection of the blocking element in response to withdrawal force applied to a component in the pocket.

17 Claims, 2 Drawing Sheets

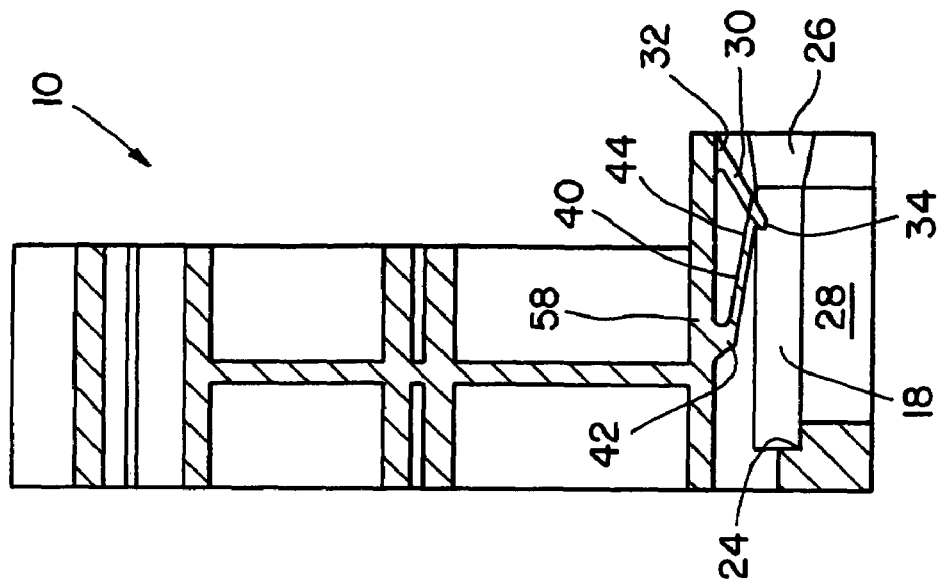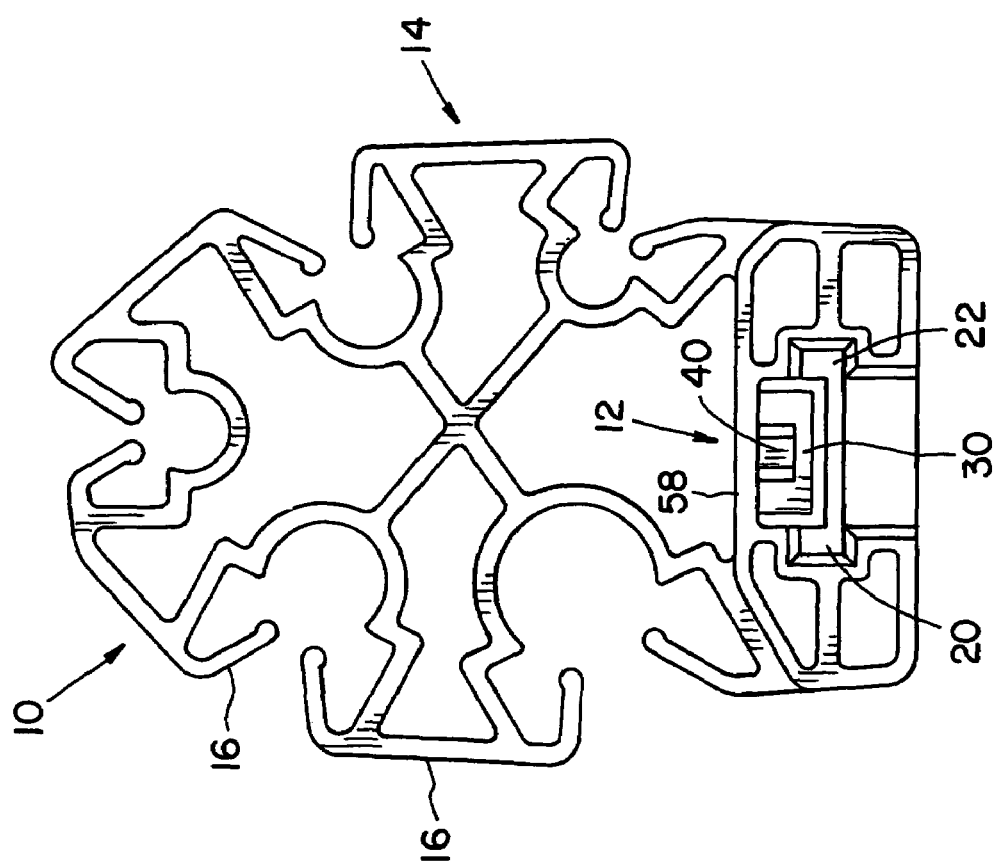

TETHERED RETAINER ASSEMBLY

FIELD OF THE INVENTION

The present invention relates generally to retainers for securing components and, more particularly, to retainers configured for holding a component of a fastener system.

BACKGROUND OF THE INVENTION

Simple fastening systems including a threaded male fastener component, such as a bolt, and a threaded female component, such as a nut, are used commonly in assemblies and constructions. Two or more items can be held together by providing aligned openings through the items and inserting and positioning the fastener system components from opposite sides of the items. A simple fastener system of this type is easy to use when both sides of the items being fastened together are readily accessible.

In many assemblies, such as automobiles, appliances and the like, fastener systems are used in situations where only one side is easily accessed when the fastener is being secured. The opposite side may have been exposed at an early stage during the assembly, but becomes enclosed as assembly progresses. In these situations it is known to use a holding fixture, referred to as a "clip", which is affixed to the structure and is configured to hold one of the fastener system components, either the male component or the female component. With the first component securely positioned, the second component can be connected thereto even when the first component is no longer readily accessible. It is known also to use such clips to improve assembly efficiency by preassembling fastener components in proper position, and thereby eliminating the somewhat cumbersome step of aligning and securing several individual components for connection. However, it is often critical to overall assembly efficiency that the components are held securely and in a fixed, accurate position. Missing or misaligned fasteners or other components can significantly disrupt an assembly process.

A simple design of a fastener retention clip includes an anchor structure by which the clip is attached to an item and a retainer structure for holding the fastener system component. It is known to use a channel or other limited access retainer structure having an opening through which the fastener component is inserted. It is known to close the opening after the fastener component is inserted so that the component is captured in the retainer structure. Closing the opening can be completed by attaching a closing piece, by deforming the entrance opening or structures near the entrance opening, or by other means. It is also known to use deflectable elements at the entrance opening that yield to the force of the fastener component being inserted and spring back to block the opening once the component is fully inserted into the retainer.

To facilitate assembly efficiency, it is desirable to minimize steps. Hence, clip designs requiring additional steps for closing the retainer opening and capturing the component held therein can be less efficient. Clips having deflectable elements require fewer steps, but are not without drawbacks. Elements that are easy to deflect, thereby facilitating assembly with the fastener component to be held thereby, also can be easy to deflect or break if the captured component is pulled outward through the entrance opening. If the elements are made more rigid to provide increased resistance to pull out, the act of inserting the component to be captured can be difficult, requiring high insertion force.

What is needed is a retainer for holding nuts, bolts and other components, which captures the component easily, yet holds it securely and resists withdrawal of the component from the retainer.

SUMMARY OF THE INVENTION

The present invention provides a retainer with a blocking element at an entrance of the retainer, and a tether connected to the blocking element to resist pullout of a component held by the retainer.

In one aspect thereof, the present invention provides a retainer for holding a component with a pocket configured for capturing at least a portion of the component therein. The pocket defines an entrance opening through which the component is inserted into the pocket. A blocking element has a fixed end and a distal end in the opening. The blocking element can be deflected to allow entrance to the pocket. A tether has an anchored end and a second end, the second end being connected to the blocking element near the distal end.

In a further aspect thereof, the present invention provides a clip for holding a component, with an anchor for connecting the clip to an article and a retainer connected to the anchor. The retainer is configured for holding the component, and includes a pocket configured for capturing at least a portion of the component therein. The pocket defines an entrance opening through which the component is inserted into the pocket. A blocking element has a fixed end and a distal end in the opening. The blocking element is deflected to allow entrance to the pocket. A tether has an anchored end and a second end, the second end being connected to the blocking element near the distal end.

In another aspect thereof, the present invention provides a retainer for holding a component. The retainer has a pocket with an entrance opening through which the component is inserted. A blocking element in the entrance opening is deflectable into the pocket. A tether restrains the blocking element from deflection in a direction away from the pocket.

An advantage of the present invention is providing a retainer for fastener components that is easy to assembly with the fastener component, yet holds the fastener component securely, resisting pullout of the component.

Another advantage of the present invention is providing a retainer that can be used for holding nuts, bolts or other items and is easy to assemble.

Another advantage of the present invention is providing a retainer clip that holds an item securely yet can be manufactured inexpensively from plastic and other inexpensive materials.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a plan view of a clip having a tethered retainer assembly in accordance with the present invention;

FIG. 2 a cross-sectional view of the tethered retainer shown in FIG. 1;

Figure 3:
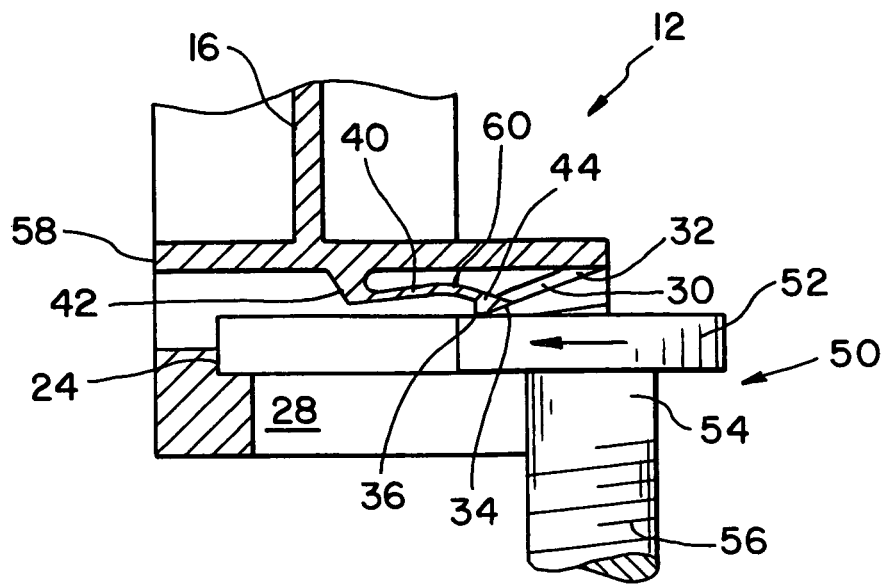
FIG. 3 is a fragmentary cross-sectional view similar to that of FIG. 2, but illustrating a fastener component being inserted into the retainer.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIGS. 1 and 2 in particular, numeral 10 designates a clip having a retainer 12 in accordance with the present invention. Clip 10 further includes an anchor portion 14 by which clip 10 can be secured to an item or article. Clip 10, including retainer 12 and anchor portion 14 is a monolithic body of suitable material. Plastics commonly are suitable for use as clip 10, although other materials also can be used for at least parts of clip 10.

Anchor portion 14 as illustrated in FIG. 1 is merely one suitable configuration. Those skilled in the art will readily understand that anchor portion 14 can be of any suitable configuration for installing and securing clip 10 to an article or item on which it is used. Thus, clip 10 can include a variety of walls 16 defining snap fit locking structures for surrounding or being inserted into portions of the item or article onto which clip 10 is installed. Further, anchor portion 14 can define holes (not shown) or other suitable structure for receiving other fasteners to secure clip 10 in the desired position. Still other interference or snap-fit configurations for anchor portion 14 can be used to secure clip 10 in a desired location and orientation.

Retainer 12 defines a pocket 18 including channels 20, 22, a back 24 and an entrance opening 26. In the embodiment of retainer 12 illustrated, entrance opening 26 is disposed at ends of channels 20, 22 opposite from back 24. An open space 28 from pocket 18 is provided between channels 20, 22, so that a component to be held in retainer 12 can be secured in pocket 12, with a portion of the component projecting from pocket 12, through open space 28.

A blocking element 30 is provided at entrance opening 26 and includes a fixed end 32 and a distal end 34 having an outermost tip 36. Blocking element 30 is deflectable in a direction inwardly toward pocket 18.

A tether 40 includes an anchored end 42 and a second end 44 affixed to blocking element 30. As will be described in further detail, tether 40 is configured and arranged with respect to blocking element 30 to restrain blocking element 30 from deflection in a direction away from pocket 18 and to cooperate with deflection of blocking element 30 in a direction into or toward pocket 18.

Figure 4:
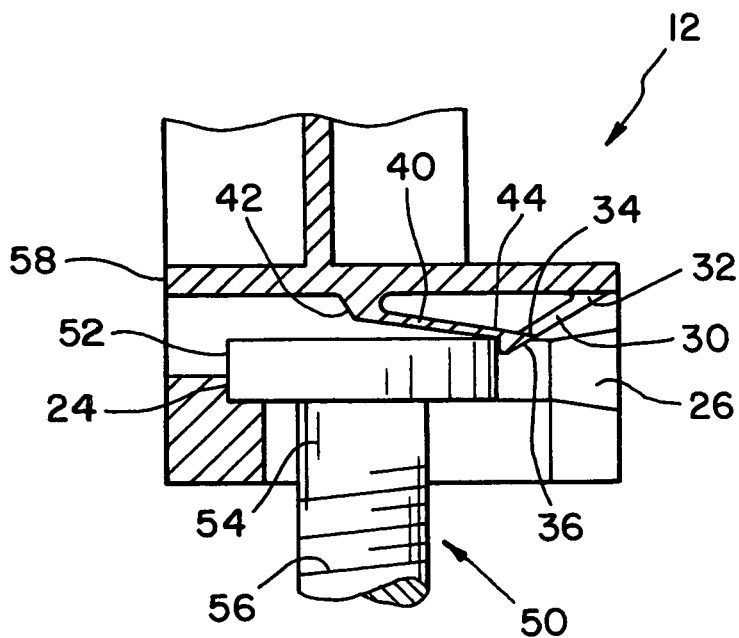
FIG. 4 is a fragmentary cross-sectional view similar to FIG. 3, but illustrating the fastener component fully inserted into the retainer.

As thus far described, retainer 12 is configured for receiving and retaining a bolt 50 having a head 52, a shank 54 and threads 56 (FIGS. 3 & 4). Head 52 is held in pocket 18, with shank 54 projecting through open space 28 such that at least a portion of thread 56 is exposed for attachment with a complementary female fastener component (not shown).

Accordingly, channels 20, 22 are configured with confronting longitudinal openings facing inwardly in pocket 18, as can be seen most clearly in FIG. 1. Channels 20, 22 are spaced a sufficient distance to receive head 52 of bolt 50 therein, with minimal free lateral movement of head 52 allowed. Back 24 defines a lip for engaging the end of head 52 opposite the end nearest entrance opening 26. Head 52 is thereby securely retained in pocket 18 with shank 54 projecting outwardly through opening 28 and exposing threads 56 thereon. To facilitate insertion of head 52, as illustrated in the drawings, the widths and depths of channels 20, 22 can be provided slightly larger at entrance opening 26 than near back 24, so that head 52 is easily aligned with channels 20, 22 to begin assembly of bolt 50 with clip 10.

Tether 40, and specifically second end 44 thereof is joined to blocking element 30 slightly inwardly on distal end 34, thereby leaving outermost tip 36 exposed. As illustrated in FIG. 4, with head 52 fully inserted into pocket 18, outermost tip 36 is held against the side of head 52 opposite the side disposed against back 24. Thus, head 52 is securely held not only between channels 20 and 22 on two opposite sides thereof, but also between back 24 and outermost tip 36 on two other opposite sides thereof. Accordingly, head 52 is held in pocket 18 in substantially fixed position.

Tether 40, and specifically anchor end 42 thereof is secured to a panel 58 inwardly within pocket 18 from entrance opening 26 relative to blocking element 30 and specifically fixed end 32 of blocking element 30. Thus, as illustrated in FIG. 3, as bolt 50 is being inserted into pocket 18, head 52 is pushed against and deflects blocking element 30 and tether 40 away from opening 28, thereby allowing head 52 to be pushed into pocket 18. Blocking element 30 and tether 40 are flattened toward panel 58, and outermost tip 36 slides all an end surface of head 52 as bolt 50 is inserted into pocket 18. As head 52 approaches back 24, an outermost edge thereof has passed outermost tip 36 of blocking element 30, and blocking element 30 rebounds as shown in FIG. 4. In the rebounded position of blocking element 30, outermost tip 36 is provided on a side of head 52 and the juncture of blocking element 30 and tether 40 engages an outer end edge of head 52. Thus, head 52 is held also biased towards opening 28.

Blocking element 30 is easily deflected along with tether 40 upon insertion of bolt 50. However, after head 52 is fully inserted in pocket 18 and blocking element 30 has rebounded, if withdrawal force is applied to bolt 50 in a direction attempting to pull head 52 from pocket 18, tether 40 secures distal end 34 such that it is not easily pulled outwardly relative to entrance opening 26. Deflection of blocking element 30 in a direction away from pocket 18 places tether 40 in tension, restraining blocking element 30 from outward deflection. Accordingly, while insertion force necessary to deflect blocking element 30 inwardly is minimal, the withdrawal or extraction force necessary to pull bolt 50 from pocket 18 is significantly higher. Accordingly, assembly of bolt 50 in retainer 12 is easily performed, yet retainer 12 provides a strong, secure retention of bolt 50 in clip 10.

To further facilitate insertion of bolt 50 into pocket 18, a flex zone or breakpoint 60 can be provided such as near the juncture of blocking element 30 and tether 40. Breakpoint 60 predisposes bending at a desired location in response to the compressive forces applied as head 52 is inserted, further reducing force required to insert head 52. However, breakpoint 60 is not of significance in responses to forces in tension that occur if bolt 50 is forced outwardly relative to pocket 18. Accordingly, the use of breakpoint 60 can increase the difference between the force required to install bolt 50 in pocket 18, and the resistance applied by blocking element 30 to withdrawal of bolt 50.

It should be understood that although retainer 12 is illustrated holding bolt 50, retainer 12 also can be configured as necessary to secure and hold other things. Accordingly, retainer 12 in accordance with the present invention can be configured to hold a nut, washer or other item, article or component. The size, shape and structures forming pocket 18 can be selected to hold the particular component desired. A variety of configurations for retainer 12 and pocket 18 can utilize features of the present invention, including blocking element 30 at an entrance opening 26 and tether 40 to provide improved retention of the item, article or component held in the pocket.

Further, blocking element 30 can take a variety of configurations and shapes as necessary to properly close entrance opening 26 after the item, article or component has been inserted into pocket 18. Further, while a single, substantially U-shaped blocking element 30 is shown in the exemplary embodiment, other shapes and configurations can be used. Two or more blocking elements also can be used. When two or more blocking elements are used, individual tethers 40 can be provided for each blocking element.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A retainer for holding a component, said retainer comprising:
   a wall;
   a pocket configured for capturing at least a portion of the component therein, said pocket defining an entrance opening through which the component is inserted into the pocket, said pocket having opposed channels in spaced relation, and said entrance opening being at ends of said channels;
   an open space opposite said wall such that said pocket is located between said wall and said open space so that when the component is held by said retainer in said pocket, a portion of the component projects from said pocket through said open space;
   a blocking element having an end fixed to said wall, and a distal end in said opening, said blocking element being deflected to allow entrance to said pocket; and
   a tether having an end anchored to said wall in a position spaced apart from said fixed end of said blocking element, and a second end, said second end being connected to said blocking element near said distal end, said tether being configured to cooperate with deflection of said blocking element to allow entry of the component into said pocket, and said tether being further configured to restrain said blocking element in a direction away from said pocket so as to securely capture the component within said pocket.

2. The retainer of claim 1, said anchored end of said tether being located inwardly in said pocket from said entrance opening relative to said fixed end of said blocking element.

3. The retainer of claim 1, said blocking element having an outermost tip, and said tether being connected to said blocking element in spaced relation to said outermost tip.

4. The retainer of claim 3, said anchored end of said tether being located in wardly in said pocket from said entrance opening relative to said fixed end of said blocking element.

5. The retainer of claim 4, including a breakpoint in said tether for directed bending in response to deflection of said blocking element.

6. The retainer of claim 4, said blocking element being substantially centrally located between said channels.

7. The retainer of claim 6, said retainer being made of plastic.

8. The retainer of claim 1, said pocket having opposed channels in spaced relation, and said entrance opening being at ends of said channels.

9. The retainer of claim 1, including a breakpoint in said tether for directed bending in response to deflection of said blocking element.

10. A clip for holding a component, said clip comprising:
    an anchor portion configured for connecting said clip to an article;
    a retainer integrally formed with said anchor portion as a single piece of material, said retainer being configured for holding the component, said retainer including;
    a wall;
    a pocket configured for capturing at least a portion of the component therein, said pocket defining an entrance opening through which the component is inserted into the pocket;
    opposed channels in spaced relation and said entrance opening being at end of said channel;
    an open space opposite said wall such that said pocket is located between said wall and said open space so that when the component is held by said retainer in said pocket, portion of the component projects from said pocket through said open space;
    a blocking element having an end fixed to said wall, and a distal end in said opening, said blocking element being deflected to allow entrance to said pocket; and
    a tether having mi end anchored to said wall in a position spaced apart from said fixed end of said blocking element, and a second end, said second end being connected to said blocking element near said distal end, said tether being configured to cooperate with deflection of said blocking element to allow entry of the component into said pocket, and said tether being further configured to restrain said blocking element in a direction away from said pocket so as to securely capture the component within said pocket.

11. The clip of claim 10, said anchor end of said tether being located inwardly in said pocket from said entrance opening relative to said fixed end of said blocking element.

12. The clip of claim 10, said blocking element having an outermost tip and said tether being connected to said blocking element away from said outermost tip.

13. The clip of claim 10, including a breakpoint in said tether for directed bending in response to deflection of said blocking element.

14. The clip of claim 11, said anchor and said retainer being made of plastic.

15. A retainer for holding a component, said retainer comprising:
    a wall;

a pocket having an entrance opening through which the component is inserted, said pocket having a back opposite said opening, said pocket having opposed channels extending from said opening to said back;

an open space opposite said wall such that said pocket is located between said wall and said open space so that when the component is held by said retainer in said pocket, a portion of die component projects from said pocket through said open space;

a blocking element fixed to said wall and extending into said entrance opening, said blocking element being deflectable into said pocket; and tether fixed to said wall in a position spaced away from where said blocking element is fixed to said wall, and affixed to said blocking element, and said tether being configured to restrain said blocking element from deflection in a direction away from said pocket, thereby effectively securing the component within said pocket such that the component is securable between said blocking element and said back of said pocket for engagement with said blocking element and said back of said pocket.

16. The retainer of claim 15, said channels being deeper at said opening than at said back.

17. The retainer of claim 15, said channels being wider at said opening than at said back.

* * * * *